July 30, 1963   C. SHEER ET AL   3,099,614
PROCESS FOR REDUCTION OF MULTIPLE OXIDES
Filed Dec. 10, 1958
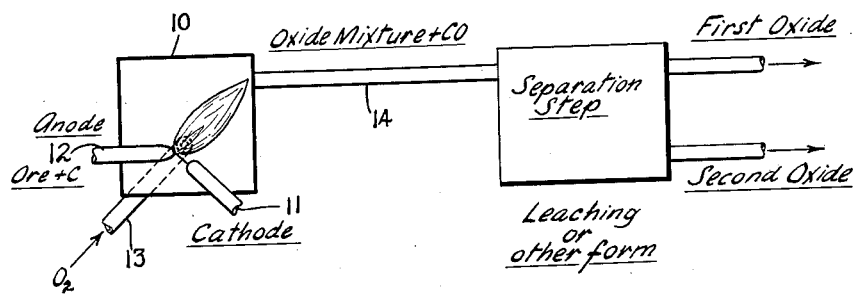
INVENTOR
CHARLES SHEER,
SAMUEL KORMAN
BY
ATTORNEY United States Patent Office 3,099,614
Patented July 30, 1963

3,099,614
PROCESS FOR REDUCTION OF
MULTIPLE OXIDES
Charles Sheer, Teaneck, N.J., and Samuel Korman, Cedarhurst, N.Y., assignors to Sheer-Korman Associates Inc., New York, N.Y., a corporation of Delaware
Filed Dec. 10, 1958, Ser. No. 779,273
3 Claims. (Cl. 204—164)

This case is a continuation-in-part of our pending application #568,879, filed March 1, 1956, which applicants abandon in favor of this application.

The invention relates to a process of breaking down certain compounds which are known metallurgically as multiple oxides. The characteristic of such compounds is that two different metal atoms or two atoms of the same metal having different valence, are linked together by being joined to a common oxygen atom to form a single molecule. One of these oxides, the compounds of which are recognized within this class, may be an oxide of silicon. These compounds are highly refractory and do not yield in any practical way to any commercial form of metal recovery.

The parent application was stated to be broadly to these multiple oxides, with a clear definition of the class. Ten compounds were recited as illustrative of the class.

In a former patent, #2,617,761, we disclosed that if certain metallic silica oxygen compounds were burned in a hierarc when immersed in a chlorine atmosphere, the anode of the arc containing a proper amount of carbon, the compound could be caused to reform as a metallic chloride, the carbon itself taking the oxygen and the silicon forming a silicon chloride.

That process was expensive and troublesome partly because of the conduct of the apparatus in an atmosphere of chlorine at very high temperatures, and in recovering and separating the products.

This invention relates to the treatment of the multiple oxide ores, to which we have referred above.

In accordance with this invention it has been discovered that excessively refractory multiple oxides may be converted to highly ionized vapors at about 10,000° C., as may be done in a hierarc, and if such vapors are cooled quickly, the individual metal atoms separately unite with the oxygen present, and no bigamous oxygen link is reestablished linking two of the elements together. Thus the exceedingly refractory multiple oxides are broken into a mixture of simple oxides, for which commercial processes of metal recovery are available.

These facts have been learned by extensive research, but the scientific cause has not yet been confirmed. It may be due to the fact that the different metal oxides are formed at different temperatures as the gases cool, so that one element can be completely oxidized at a temperature above that at which the other oxide can form. Or it may concern the quantum of energy required for the formation of the different oxides.

Whatever the explanation, the resultant mixture of individual oxides can be separated and treated by well-known processes to which the original ore would not yield at all.

This is commercially of great importance because this mixture of simple oxides readily yields to commercial procedures for their separation to which the complex crystal will not yield. In this way, by combining the breaking down of the refractory crystal, thereby converting it into such a simple mixture, with the subsequent application of known processes of separation, the recovery of the values from the refractory ores becomes relatively simple and inexpensive, and the separation more complete and efficient. This makes these otherwise waste minerals available for treatment.

Heretofore, attempts to treat ores containing such complex oxides have been so troublesome and expensive that they have been tried only where the values to be recovered were very high. These steps have generally been operated at from 980° C. to 1650° C., and these include chemical, hydro-metallurgical and pyro-metallurgical techniques, which are so slow and expensive that metals from such sources are not generally available. In many cases the recovery process has been so expensive and the yield so poor that the ore is not of commercial value, and is not used, even though it may contain a high percentage of the desired metal.

For example, rhodonite, which is a complex manganese silicate containing 42% manganese, occurs massively in the United States. Associated with it are crevices of quartz carrying gold, silver and other values.

The rhodonite is so intractable that although it had to be blasted away to get at the quartz for the sake of the precious metal content, the rhodonite itself has been discarded. This is in spite of the fact that manganese is in great demand, and this country must depend upon imports for its supply, because no practical way of recovering the manganese from rhodonite was available.

Similarly, large deposits of euxenite, containing an equivalent of 6% to 8% of $U_3O_8$, a complex oxide bound with tantalum and other valuable metals cannot be worked compared to other ores such as pitch blende or carnotite containing less than 0.2% of $U_3O_8$.

The class of multiple oxides is well known in mineralogy and it is known that it is this bigamous oxygen atom which unites the two different metal atoms which makes them refractory. The stability of that linkage system is completely destroyed at such ultra-high temperatures in a hierarc, and as the elements and compounds are reformed the bigamous link does not again appear.

As we have mentioned, in some of these ores one of the oxides is an oxide of silicon. Although the silicon is, strictly speaking, metalloidal, these ores nevertheless exhibit the same refractory characteristics as the multiple oxide metal ores, and yield to the same treatment described herein; they are therefore included within the class of multiple oxides.

Among the multiple oxides for which the process is particularly available we may mention the ones in the following list. It will be understood, however, that since the process is pyrometallurgical rather than chemical, it is the refractory character of the ore rather than the chemical classification of the constituent metals with which the process is involved. It will be understood, however, that the process will operate with any complex oxide now known.

*List of Oxides*

Kaolin—$Al_2O_3 \cdot SiO_2 \cdot 2H_2O$
Feldspar—e.g. $K_2O \cdot Al_2O_3 \cdot 6SiO_2$
Beryllium: Beryl—$3BeO \cdot Al_2O_3 \cdot 6SiO_2$
Chromium: Chromite—$FeO \cdot Cr_2O_3$
Columbium: Pyrochlore—$RCb_2O_6 \cdot R(Ti,Th)O_3$
Lithium: Spodumene—$Li_2O \cdot Al_2O_3 \cdot 4SiO_2$
Magnesium: Serpentine—$3MgO \cdot 2SiO_2 \cdot 2H_2O$
Manganese:
    Rhodonite—$MnSiO_3$
    Braunite—$3Mn_2O_3 \cdot MnSiO_3$
    Hausmanite—$Mn_3O_4$
    Bemenite
Tantalum:
    Tapiolite—$(Fe, Mn) [(Cb, Ta)O_3]_2$
    Microlite—$6CaO \cdot 3Ta_2O_5 \cdot CbOF_3$ Thorium:
    Thorite—$ThSiO_4$
    Zirkelite $(Ca, Fe, Th, U)_2 (Ti, Zr)_2O_5$
Titanium:
    Ilmenite—$FeO \cdot TiO_2$
    Perovskite—$CaO \cdot TiO_2$
Uranium:
    Euxenite—$(Y, Ca, Ce, U, Th) (Cb, Ta, Ti)_2O_6$
    Polycrase—$(Y, Ca, Ce, U, Th) (Cb, Ta, Ti)_2O_6$
    Pitchblende—$U_3O_8$
Rare Earths:
    Fergusonite—$(YErCeFe) (TaCbTi)O_4$
    Samarskite—$(Y, Er, Ce, U, Ca, Fe, Pb, Th) (Cb, Ta, Ti, Sn)_2O_6$
Zirconium: Zirconite—$ZrSiO_4$ Thus the complex oxide $FeTiO_3$, occurring naturally as ilmenite, can be considered as a combination of the two simple oxides $FeO$ and $TiO_2$, similarly rhodonite, $MnSiO_3$, may be considered as comprised of $MnO$ and $SiO_2$; whereas feldspar, $K_2OAl_2O_36SiO_2$ consists of one molecule each of $K_2O$ and $Al_2O_3$, and six molecules of $SiO_2$.

There are a number of other multiple oxides which do not generally occur as natural ores, but which result from other commercial processes, such for example as titanium slags, which are equally subject to this process, the slag comprising as it does a multiple oxide of calcium and titanium and sometimes silicon and iron.

It will be noted that in some of the complex oxides such as pitchblende, magnetite and hausmanite, the mineral is of two oxides of the same element. In such cases the metal exhibits a different valence for each of the constituent simple oxides. For example, $U_3O_8$ can be considered to be composed of two molecules of $UO_3$, in which the uranium is in the hexavalent state, and one molecule of $UO_2$, in which it is in the tetravalent state. Similiarly, $Fe_3O_4$ contains one molecule each of $FeO$ and $Fe_2O_3$, wherein the iron exists in the divalent and trivalent states respectively, etc.

In accordance with this invention, it has been discovered that these excessively stable oxides can be vaporized and decomposed and converted into amenable form at ultra-high temperatures.

The particular manner in which the crystal is broken apart will be chosen as to produce the greatest ease of subsequent separation and use.

In many cases, for example, one of the resultant oxides so formed is more soluble than the other, so that it may be separated out by chemical means. In other cases, after they are broken apart, the mixed oxides may be separated out by chemical means. In other cases, after they are broken apart, the mixed oxides may be separated out by their physical properties.

In cases where there are a number of oxides which a particular metal will assume, the decomposition may be used to produce the most favorable oxide; generally, however, the process will be so conducted as to reform oxides in which the metals have the same valence as they had in the original complex oxide.

The process will involve the fabrication of an electrode by including the ore, with a carbon source, and baking it, and then burning the electrode in a hierarc in the presence of sufficient oxygen to consume the carbon, and recovering the product condensed therefrom. In the arc plasma, the constituent metals are converted to ionized vapors of the individual metals, but as they cool in the arc flame they became individually oxidized and may be recovered as such, the carbon passing off as the oxide gas. Thereafter, the mixture of solid oxides may be separated by the common procedures of the art, towards which the process was directed.

If, however, we are dealing with a metal having two oxides of different valence, it has been found that in the ionized plasma of the arc, the ultimate valence of the metal may be controlled by the quantity of oxygen present in the plasma. Then we may choose which oxide is the most amenable and inject oxygen into the flame to increase the valence to the higher value, or restrict the oxygen content to reduce the valence to the lower value. Since this is done at very high temperatures, it has been found that the relative quantity of oxygen present will help to determine the valence of the oxide formed. Except where a reduction of valence is required, it is necessary to provide only enough carbon to cause the electrode to carry the current.

We may first illustrate the process as applied to rhodonite. Returning now to the figure, which may represent the reduction of rhodonite, the numeral 10 represents an arc chamber in which a high erosion arc is maintained between the carbon cathode 11 and an anode 12, this anode comprising a mixture of the ore to be reduced and enough carbon to render the electrode conducting.

If the ore contains carbonates and other gas producing materials, the dry solids may be calcined for an hour at about 980° C. The product thus formed is ground to about −60 mesh and then mixed with soft or semibituminous coal with a VCM about 21% but low in nitrogen or oxygen; and with an extrusion aid, such as glutrin, resinous oil, methyl cellulose, dextrine or bentonite, the proportion of ore to coal approximately four to one.

The product thus formed is extruded to form unbaked rods. This rod, comprising a mixture of carbon and the ore is then enclosed in a suitable heat-resistant mold, which may be of silicon carbide, or graphite, or stainless steel, and baked at a temperature somewhat less than the melting point of the ore, but at least 900° C. The arc effluent is collected in a suitable tank or filter.

During the baking the mold will be kept in an inert atmosphere, and the rate or rise of temperature should be as high as practicable, and the time the rod is held at the maximum temperature should be held to a minimum, to secure a properly conducting anode for minimum expenditure of heat for baking.

The last step in the process, after removing the anode from the mold, is to fit it into the arc chamber 10 as the anode of a D.C. high erosion arc, having a current density between it and the cathode 11 above a value required to produce a high erosion effect, for example, of 200 amperes per square inch. A D.C. arc is preferable in many cases, but an A.C. arc may be employed in a similar manner.

The voltage will be about 70 volts, and through an inlet 13 only enough oxygen will be admitted to consume the carbon of the anode to form preponderant CO, since with this ore oxidation is not desired. The object of the atmosphere control will be to limit the oxidation of the manganese to its lowest state of oxide, that is, MnO. The inlet is preferably situated at a point to introduce the oxygen near the beginning of the tail flame, and the oxygen may be introduced into the arc as a jet. The effluent from the arc is collected by conventional means, such as dust collectors or electro-static precipitators. It will contain MnO and $SiO_2$.

Any suitable conventional means may be used to separate out the manganese oxide. It may be leached and filtered selectively with sulfuric acid, or by ammonium carbamate solutions. If sulfuric acid is used, the manganous sulfate is available for further processing to manganous oxide for ferro-alloy, or to manganese dioxide for dry cells, or electro-deposition. The ammonium carbamate solution of manganese is processed for production of manganous oxide for ferro-alloy or chemical production.

An ammonium sulfate solution is used for electro-deposition of manganese metal. All of these processes are well known.

As a second illustration we may refer to the recovery of titanium from ilmenite, or from furnace slags, containing titanium or silica in complex form.

Here the treatment of the ore is the same as that previously described in the treatment of rhodonite, except that in the case of ilmenite it is desirable to produce the higher oxides of iron, $Fe_2O_3$ and $Fe_3O_4$, so that a controlled excess of oxygen will be introduced into the tail flame, where iron is a major constituent of the ore, to oxidize the iron to a higher state. For slags, from which iron is not a major constituent, the atmosphere control is secondary.

In the case of ilmenite, the effluents of the arc may be separated in any conventional way, or they may be passed through a magnetic field, removing the iron and leaving the titanium oxides, $TiO_2$, suitable for use in making titanium compounds, and for industrial application for pigment production.

The main beneficiation of ilmenite is to produce a grade of oxide equivalent to rutile for the trade.

When slags are used, selective acid leach is used to remove titanium from the silica, etc. by filtration, and then the sulfate is calcined to make $TiO_2$ for use as above.

From the above description it will be clear that the arc treatment of the initial product is similar, regardless of what complex oxide is to be treated, except that the oxygen content of the arc flame is used to control which oxide is to be formed to facilitate the subsequent separation and that the steps subsequent to the formation of the oxide mixture are conventional in metallurgy.

The words "amenable form" are used in this application to designate a form for the individual component resulting from a complex oxide in which one of the components may be separated from the others by a customary commercial process, such as leaching or flotation, or other common and selective procedures.

Sometimes, all the undesired compounds are soluble, whereas the desired one is insoluble, in which case the residue of the filtration step constitutes the end product. Obviously, the exact technique and reagents used in leading depends upon the specific material. Sometimes properties peculiar to a given substance will afford the possibility of recovering the desired component in a highly pure state and in a simple and pure manner. For example, if beryl is decomposed in the arc, the beryllium oxide may be converted into a basic beryllium acetate by the use of glacial acetic acid, with a little moist ammonium or sodium carbonate added as the leaching agent. In this case, both the beryllium and the aluminum oxides will be converted to the acetates, whereas the silica will not be affected. Then the beryllium may be quantitatively removed from the mix simply by subliming the mixture at relatively low temperature, since the beryllium basic acetate is peculiar in that it may be vaporized without decomposition. The aluminum acetate will decompose back into aluminum oxide, which, of course, is nonvolatile, and the vapor of acetic acid. The sublimate therefore will consist only of the beryllium basic acetate and excess acetic acid from which it is readily removed by simple distillation. The beryllium basic acetate is then further broken down into extremely pure BeO and acetic acid (for recycling) by any one of a number of simple procedures.

Sometimes, in order to effect the leaching of a desired metallic oxide, it may be necessary to alter the chemical state of the desired compounds. Consider the case of one of the chemical forms of euxenite: $UO_2 2TiO_2$. This complex oxide obviously consists of a combination between one molecule of uranous oxide, $UO_2$, and two molecules of titanium dioxide, $TiO_2$. However, both uranium dioxide and titanium dioxide are insoluble. On the other hand, uranium trioxide, $UO_3$, is readily soluble in dilute acids; and, since titanium does not form any other oxides, we prefer to convert $UO_2$ to $UO_3$ before the leaching. For this purpose, we inject air or gas containing oxygen into the arc flame, which would make the required conversion directly. An alternative, but obviously less desirable procedure, is to add an oxidizing agent to make the conversion just before leaching.

Sometimes the products of an arc decomposition have physical properties which serve as the basis for a dry separation. This eliminates the need for chemical reagents and the usual difficulties of wet chemistry, and is therefore inherently more economical. The physical properties which can serve in this manner include magnetic susceptibility, dielectric constant, and density. A good example of the magnetic separation is the products of a rhodonite decomposition, since the magnetic susceptibility of MnO is 76 units, as compared to −0.49 units for the $SiO_2$. Therefore, when the products emerge from the arc and have cooled to normal temperatures, they can be carried in a stream of air and made to pass between a narrow gap in a magnetic field in such a way that the magnetic force on the MnO particles tends to deflect them to one side of a barrier; whereas, the $SiO_2$ particles are practically unaffected, and emerge on the other side.

A high degree of separation must require the cascading of a number of stages. In addition, because of the fine particle size of the arc product, it is desirable to carry this out in a partial vacuum in order to reduce the dispersing effect of Brownian movement and increase the natural rate of fall of the particles so as to effect a clean separation. Another example of this would be ilmenite, $FeOTiO_2$, for which the iron oxide will have a much greater magnetic susceptibility than the titanium dioxide.

An analogous type of separation can be used when wide differences occur in the dielectric constants of the constituent oxides. In this case, an electric field is substituted for the magnetic field. A good material for this type of separation is the type of euxenite mentioned above, since the dielectric constant of $TiO_2$ is 117 units as compared with 1 unit for the $UO_2$. This has the advantage of eliminating the necessity for converting the $UO_2$ to $UO_3$, especially since $UO_2$ is the form most desired for the reduction to uranium metal.

What we claim is:

1. The process of converting multiple oxides to amenable form which comprises forming an anode of the multiple oxide with sufficient carbon to render the anode conducting, operating a high erosion arc with such anode, projecting a jet of gas containing oxygen into the arc flame to fix the anode carbon and to chill the resultant products below the temperature at which the multiple oxide can form.

2. The process of converting multiple oxides, one of said oxides having alternative forms, to amendable form which comprises forming an anode of the multiple oxide with sufficient carbon to render the anode conducting, operating a high erosion arc with such anode, injecting into the arc a gas containing oxygen in sufficient quantity to control its partial pressure in the gas and thereby to cause the formation from the metal values concerned in the multiple oxide of the alternative individual oxide which is subject to the greater ease of separation.

3. The process of converting multiple oxides which comprises heating the multiple oxides to a temperature high enough to break the multiple bond, then cooling the resultant product with just sufficient oxygen to form the desired amendable oxides.

References Cited in the file of this patent

UNITED STATES PATENTS 2,617,761    Sheer et al.            Nov. 11, 1952

FOREIGN PATENTS 223,271    Great Britain           Oct. 11, 1924